United States Patent
Yada et al.

(10) Patent No.: US 7,292,540 B2
(45) Date of Patent: Nov. 6, 2007

(54) NETWORK MONITORING AND CONTROLLING APPARATUS

(75) Inventors: Toshiyuki Yada, Kawasaki (JP); Osamu Kobayashi, Kawasaki (JP); Yoshiyasu Sutou, Kawasaki (JP); Satoshi Kumano, Kawasaki (JP); Hideki Maeda, Kawasaki (JP); Tomoko Saruwatari, Kawasaki (JP); Takashi Yoshitake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 845 days.

(21) Appl. No.: 10/786,719

(22) Filed: Feb. 24, 2004

(65) Prior Publication Data

US 2004/0165526 A1    Aug. 26, 2004

Related U.S. Application Data

(63) Continuation of application No. PCT/JP01/07904, filed on Sep. 12, 2001.

(51) Int. Cl.
H04L 12/26 (2006.01)
(52) U.S. Cl. .................. 370/253; 370/228; 370/248
(58) Field of Classification Search ............. 370/241, 370/242, 248, 252, 253, 228
See application file for complete search history.

(56) References Cited

U.S. PATENT DOCUMENTS 6,205,120 B1* 3/2001 Packer et al. .............. 370/235
6,333,932 B1* 12/2001 Kobayasi et al. .......... 370/389
6,339,587 B1* 1/2002 Mishra ....................... 370/255
6,542,934 B1* 4/2003 Bader et al. ................ 709/239
6,856,593 B2* 2/2005 Nakajima ................... 370/218
7,065,040 B2* 6/2006 Nagamine .................. 370/223
2001/0019536 A1* 9/2001 Suzuki ....................... 370/226
2006/0256712 A1* 11/2006 Imajuku et al. ............ 370/218

FOREIGN PATENT DOCUMENTS

JP         9-055751      2/1997
JP         2000-196608   7/2000

* cited by examiner

Primary Examiner—Ricky Q. Ngo
Assistant Examiner—Ankit P. Gandhi
(74) Attorney, Agent, or Firm—Katten Muchin Rosenman LLP

(57) ABSTRACT

A network monitoring and controlling apparatus for monitoring and controlling a transmission network formed by a plurality of transmission apparatus includes: a path information storing unit for storing path information; a quality information periodic collection unit for periodically collecting quality information; a quality deterioration detecting unit for determining whether or not quality of the path is deteriorated; a path via point searching unit searching the path information storing unit and obtaining information on a path via points of the path deteriorated in quality; a path via point quality information collection unit for collecting quality information of channels corresponding to the path via points; and a quality deterioration point identifying unit for determining whether or not a deteriorated path via point is present.

10 Claims, 16 Drawing Sheets

FIG.5

| PATH NAME | ENTRANCE | EXIT | INTERMEDIATE PATH | |
|---|---|---|---|---|
| | | | ACTIVE PATH | TRANSMISSION APPARATUS 32#C, 32#D, AND 32#F |
| PATH a | TRANSMISSION APPARATUS 32#A | TRANSMISSION APPARATUS 32#G | RESERVE PATH | TRANSMISSION APPARATUS 32#B, 32#D, AND 32#E |
| ... | ... | ... | ... | ... |

FIG.6

| PATH NAME | POINT | QUALITY INFORMATION | | | |
|---|---|---|---|---|---|
| | | PRESENT TIME | PRESENT $-T1\times 1$ | ... | PRESENT $-T1\times n$ |
| | ENTRANCE | | | | |
| | EXIT | | | | |
| | (entrance-exit) quality | | | | |
| | QUALITY DETERIORATION | | | | |
| | ACTIVE PATH INTERMEDIATE POINTS ⋮ | | ⋮ | ⋮ | ⋮ |
| | | | | | |
| | RESERVE PATH INTERMEDIATE POINTS ⋮ | | | | |
| | | | | | |
| ⋮ | ⋮ | ⋮ | ⋮ | ⋮ | ⋮ |

FIG.7

| POINT | | QUALITY | | | | |
|---|---|---|---|---|---|---|
| | | PRESENT TIME | PRESENT -T1×1 | PRESENT -T1×2 | ... | PRESENT -T1×n |
| ENTRANCE(A) | | 0 | 0 | 0 | ... | 0 |
| EXIT(B) | | 3 | 3 | 0 | ... | 0 |
| (entrance-exit) quality | | -3 | -3 | 0 | ... | 0 |
| QUALITY DETERIORATION | | DETERIORATED | DETERIORATED | NOT DETERIORATED | ... | NOT DETERIORATED |
| ACTIVE PATH INTERMEDIATE POINTS | (C) | 0 | − | − | ... | − |
| | (D) | 0 | − | − | ... | − |
| | (F) | 3 | − | − | ... | − |
| RESERVE PATH INTERMEDIATE POINTS | (B) | 0 | − | − | ... | − |
| | (D) | 0 | − | − | ... | − |
| | (E) | 0 | − | − | ... | − |

CONDITION FOR READING QUALITY INFORMATION
OF INTERMEDIATE PATH : (entrance-exit)quallity
BECOMES A NEGATIVE VALUE

FIG.8

| POINT | QUALITY | | | | |
|---|---|---|---|---|---|
| | PRESENT TIME | PRESENT -T1×1 | PRESENT -T1×2 | ... | PRESENT -T1×n |
| ENTRANCE(A) | 0 | 0 | 0 | ... | 0 |
| EXIT(B) | 3 | 8 | 3 | ... | 0 |
| (entrance-exit) quality | -3 | -8 | -3 | ... | 0 |
| THRESHOLD VALUE | -5 | | | | |
| QUALITY DETERIORATION | NOT DETERIORATED | DETERIORATED | NOT DETERIORATED | ... | NOT DETERIORATED |
| ACTIVE PATH INTERMEDIATE POINTS (C) | 0 | — | — | ... | — |
| ACTIVE PATH INTERMEDIATE POINTS (D) | 0 | — | — | ... | — |
| ACTIVE PATH INTERMEDIATE POINTS (F) | 3 | — | — | ... | — |
| RESERVE PATH INTERMEDIATE POINTS (B) | 0 | — | — | ... | — |
| RESERVE PATH INTERMEDIATE POINTS (D) | 0 | — | — | ... | — |
| RESERVE PATH INTERMEDIATE POINTS (E) | 0 | — | — | ... | — |

CONDITION FOR READING QUALITY INFORMATION
OF INTERMEDIATE PATH :
(entrance-exit) quallity < THRESHOLD VALUE

FIG.9

| POINT | QUALITY | | | | |
|---|---|---|---|---|---|
| | PRESENT TIME | PRESENT -T1×1 | PRESENT -T1×2 | ... | PRESENT -T1×n |
| ENTRANCE(A) | 0 | 0 | 0 | ... | 0 |
| EXIT(B) | 3 | 8 | 8 | ... | 0 |
| (entrance-exit) quality | -3 | -8 | -8 | ... | 0 |
| THRESHOLD VALUE | -5 | | | | |
| CONSECUTIVE NUMBER | 0 | 2 | 1 | ... | — |
| QUALITY DETERIORATION | NOT DETERIORATED | DETERIORATED | NOT DETERIORATED | ... | NOT DETERIORATED |
| ACTIVE PATH INTERMEDIATE POINTS (C) | 0 | — | — | ... | — |
| ACTIVE PATH INTERMEDIATE POINTS (D) | 0 | — | — | ... | — |
| ACTIVE PATH INTERMEDIATE POINTS (F) | 3 | — | — | ... | — |
| RESERVE PATH INTERMEDIATE POINTS (B) | 0 | — | — | ... | — |
| RESERVE PATH INTERMEDIATE POINTS (D) | 0 | — | — | ... | — |
| RESERVE PATH INTERMEDIATE POINTS (E) | 0 | — | — | ... | — |

CONDITION FOR READING QUALITY INFORMATION
OF INTERMEDIATE PATH : (entrance-exit) quallity
< THRESHOLD VALUE TWO CONSECUTIVE OR MORE

FIG.10

| POINT | QUALITY | | | | |
|---|---|---|---|---|---|
| | PRESENT TIME | PRESENT -T1×1 | PRESENT -T1×2 | PRESENT -T1×3 | ... |
| ENTRANCE(A) | 0 | 0 | 0 | 0 | ... |
| EXIT(B) | 3 | 8 | 0 | 8 | ... |
| (entrance-exit) quality | -3 | -8 | 0 | -8 | ... |
| THRESHOLD VALUE | -5 | | | | |
| TOTAL NUMBER | 0 | 2 | 1 | 1 | ... |
| QUALITY DETERIORATION | DETERIORATED | DETERIORATED | NOT DETERIORATED | NOT DETERIORATED | ... |
| ACTIVE PATH INTERMEDIATE POINTS (C) | 0 | − | − | | ... |
| ACTIVE PATH INTERMEDIATE POINTS (D) | 0 | − | − | | ... |
| ACTIVE PATH INTERMEDIATE POINTS (F) | 3 | − | − | | ... |
| RESERVE PATH INTERMEDIATE POINTS (B) | 0 | − | − | | ... |
| RESERVE PATH INTERMEDIATE POINTS (D) | 0 | − | − | | ... |
| RESERVE PATH INTERMEDIATE POINTS (E) | 0 | − | − | | ... |

CONDITION FOR READING QUALITY INFORMATION
OF INTERMEDIATE PATH : (entrance-exit) quallity
< THRESHOLD VALUE TWICE OR MORE IN TOTAL

FIG.11

| POINT | QUALITY | | | | |
|---|---|---|---|---|---|
| | PRESENT TIME | PRESENT -T1×1 | PRESENT -T1×2 | ... | PRESENT -T1×n |
| ENTRANCE(A) | 0 | 0 | 0 | ... | 0 |
| EXIT(B) | 3 | 8 | 6 | ... | 0 |
| (entrance-exit) quality | -3 | -8 | -6 | ... | 0 |
| THRESHOLD VALUE | -5 | | | | |
| QUALITY DETERIORATION | NOT DETERIORATED | DETERIORATED | DETERIORATED | ... | NOT DETERIORATED |
| ACTIVE PATH INTERMEDIATE POINTS (C) | 0 | 0 | 0 | ... | — |
| ACTIVE PATH INTERMEDIATE POINTS (D) | 0 | 0 | 0 | ... | — |
| ACTIVE PATH INTERMEDIATE POINTS (F) | 3 | 8 | 6 | ... | — |
| RESERVE PATH INTERMEDIATE POINTS (B) | 0 | 0 | 0 | ... | — |
| RESERVE PATH INTERMEDIATE POINTS (D) | 0 | 0 | 0 | ... | — |
| RESERVE PATH INTERMEDIATE POINTS (E) | 0 | 0 | 0 | ... | — |
| QUALITY COMPARISON BETWEEN ACTIVE SYSTEM AND RESERVE SYSTEM | ACTIVE-RESERVE=8 | ACTIVE-RESERVE=8 | ACTIVE-RESERVE=6 | ... | — |
| THRESHOLD VALUE | 7 | | | | |
| CHANGEOVER TO RESERVE PATH | — | PERFORM | — | ... | — |

CONDITION FOR CHANGING OVER TO RESERVE PATH :
VALUE OF QUALITY COMPARISON BETWEEN ACTIVE
SYSTEM AND RESERVE SYATEM > THRESHOLD VALUE

FIG.12

| POINT | QUALITY | | | | |
|---|---|---|---|---|---|
| | PRESENT TIME | PRESENT -T1×1 | PRESENT -T1×2 | ... | PRESENT -T1×n |
| ENTRANCE(A) | 0 | 0 | 0 | ... | 0 |
| EXIT(B) | 8 | 8 | 6 | ... | 0 |
| (entrance-exit) quality | -8 | -8 | -6 | ... | 0 |
| THRESHOLD VALUE | -3 | | | | |
| QUALITY DETERIORATION | DETERIORATED | DETERIORATED | DETERIORATED | ... | NOT DETERIORATED |
| ACTIVE PATH INTERMEDIATE POINTS (C) | 0 | 0 | 0 | ... | — |
| ACTIVE PATH INTERMEDIATE POINTS (D) | 0 | 0 | 0 | ... | — |
| ACTIVE PATH INTERMEDIATE POINTS (F) | 8 | 8 | 3 | ... | — |
| RESERVE PATH INTERMEDIATE POINTS (B) | 0 | 0 | 0 | ... | — |
| RESERVE PATH INTERMEDIATE POINTS (D) | 0 | 0 | 0 | ... | — |
| RESERVE PATH INTERMEDIATE POINTS (E) | 0 | 0 | 0 | ... | — |
| QUALITY COMPARISON BETWEEN ACTIVE SYSTEM AND RESERVE SYSTEM | ACTIVE-RESERVE=8 | ACTIVE-RESERVE=8 | ACTIVE-RESERVE=3 | ... | — |
| THRESHOLD VALUE | 5 | | | | |
| CONSECUTIVE NUMBER | 2 | 1 | — | ... | — |
| CHANGEOVER TO RESERVE PATH | PERFORM | — | — | ... | — |

CONDITION FOR CHANGING OVER TO RESERVE PATH : RESULT OF QUALITY COMPARISON BETWEEN ACTIVE SYSTEM AND RESERVE SYSTEM EXCEEDS THRESHOLD VALUE TWO CONSECUTIVE TIMES OR MORE

FIG.13

| POINT | | QUALITY | | | | |
|---|---|---|---|---|---|---|
| | | PRESENT TIME | PRESENT -T1×1 | PRESENT -T1×2 | ... | PRESENT -T1×n |
| ENTRANCE(A) | | 0 | 0 | 0 | ... | 0 |
| EXIT(B) | | 3 | 8 | 8 | ... | 0 |
| (entrance-exit) quality | | -3 | -8 | -8 | ... | 0 |
| THRESHOLD VALUE | | -5 | | | | |
| CONSECUTIVE NUMBER | | 0 | 2 | 1 | ... | — |
| QUALITY DETERIORATION | | NOT DETERIORATED | DETERIORATED | NOT DETERIORATED | ... | NOT DETERIORATED |
| ACTIVE PATH INTERMEDIATE POINTS | (C) | 0 | 0 | 0 | ... | — |
| | (D) | 0 | 0 | 0 | ... | — |
| | (F) | 3 | 8 | 8 | ... | — |
| RESERVE PATH INTERMEDIATE POINTS | (B) | 0 | 0 | 0 | ... | — |
| | (D) | 0 | 0 | 0 | ... | — |
| | (E) | 0 | 0 | 0 | ... | — |
| QUALITY COMPARISON BETWEEN ACTIVE SYSTEM AND RESERVE SYSTEM | | ACTIVE> RESERVE | ACTIVE> RESERVE | ACTIVE> RESERVE | ... | — |
| CONSECUTIVE NUMBER | | 3 | 2 | 1 | ... | — |
| CHANGEOVER TO RESERVE PATH | | PERFORM | — | — | ... | — |

CONDITION FOR CHANGING OVER TO RESERVE PATH :
ACTIVE SYSTEM QUALITY > RESERVE QUALITY THREE
CONSECUTIVE TIMES

FIG.14

| POINT | | QUALITY | | | | |
|---|---|---|---|---|---|---|
| | | PRESENT TIME | PRESENT -T1×1 | PRESENT -T1×2 | ... | ... |
| ENTRANCE(A) | | 0 | 0 | 0 | 0 | ... |
| EXIT(B) | | 10 | 8 | 8 | 10 | ... |
| (entrance-exit) quality | | 10 | -8 | -8 | -10 | ... |
| THRESHOLD VALUE | | -5 | | | | |
| QUALITY DETERIORATION | | DETERIORATED | DETERIORATED | DETERIORATED | DETERIORATED | ... |
| ACTIVE PATH INTERMEDIATE POINTS | (C) | 0 | 0 | 0 | 0 | ... |
| | (D) | 0 | 0 | 0 | 0 | ... |
| | (F) | 10 | 8 | 8 | 10 | ... |
| RESERVE PATH INTERMEDIATE POINTS | (B) | 0 | 0 | 0 | 0 | ... |
| | (D) | 0 | 0 | 0 | 0 | ... |
| | (E) | 0 | 0 | 0 | 0 | ... |
| QUALITY COMPARISON BETWEEN ACTIVE SYSTEM AND RESERVE SYSTEM | | ACTIVE-RESERVE=10 | ACTIVE-RESERVE=8 | ACTIVE-RESERVE=8 | ACTIVE-RESERVE=10 | ... |
| THRESHOLD VALUE | | 9 | | | | |
| WHETHER THRESHOLD VALUE HAS BEEN EXCEEDED TWICE IN PAST FOUR TIMES | | EXCEEDED | NOT EXCEEDED | NOT EXCEEDED | NOT EXCEEDED | ... |
| CHANGEOVER TO RESERVE PATH | | PERFORM | — | — | — | ... |

CONDITION FOR CHANGING OVER TO RESERVE PATH : RESULT OF QUALITY COMPARISON BETWEEN ACTIVE SYSTEM AND RESERVE SYSTEM EXCEEDS THRESHOLD VALUE TWICE OR MORE IN PAST FOUR TIMES

FIG.16A

| POINT | QUALITY | | | | |
|---|---|---|---|---|---|
| | PRESENT TIME | PRESENT-T1×1 | PRESENT-T1×2 | ... | PRESENT-T1×n |
| ENTRANCE(A) | 0 | 0 | 0 | ... | 0 |
| EXIT(B) | 0 | 0 | 0 | ... | 0 |

FIG.16B

| POINT | | QUALITY | | | | |
|---|---|---|---|---|---|---|
| | | PRESENT TIME | PRESENT-T1×1 | PRESENT-T1×2 | ... | PRESENT-T1×n |
| ENTRANCE(A) | | 0 | 0 | 0 | ... | 0 |
| EXIT(B) | | 3 | 3 | 0 | ... | 0 |
| (entrance-exit) quality | | -3 | -3 | 0 | ... | 0 |
| QUALITY DETERIORATION | | DETERIORATED | DETERIORATED | NOT DETERIORATED | ... | NOT DETERIORATED |
| ACTIVE PATH INTERMEDIATE POINTS | (C) | 0 | − | − | ... | − |
| | (D) | 0 | − | − | ... | − |
| | (F) | 3 | − | − | ... | − |

CONDITION FOR READING QUALITY INFORMATION OF INTERMEDIATE PATH :
(entrance-exit)quallity BECOMES A NEGATIVE VALUE

FIG.16C

| POINT | | QUALITY | | | | |
|---|---|---|---|---|---|---|
| | | PRESENT TIME | PRESENT-T1×1 | PRESENT-T1×2 | ... | PRESENT-T1×n |
| ENTRANCE(A) | | 0 | 0 | 0 | ... | 0 |
| EXIT(B) | | 3 | 3 | 0 | ... | 0 |
| (entrance-exit) quality | | -3 | -3 | 0 | ... | 0 |
| QUALITY DETERIORATION | | DETERIORATED | DETERIORATED | NOT DETERIORATED | ... | NOT DETERIORATED |
| ACTIVE PATH INTERMEDIATE POINTS | (C) | 0 | − | − | ... | − |
| | (D) | 0 | − | − | ... | − |
| | (F) | 3 | − | − | ... | − |
| RESERVE PATH INTERMEDIATE POINTS | (B) | 0 | − | − | ... | − |
| | (D) | 0 | − | − | ... | − |
| | (E) | 0 | − | − | ... | − |

CONDITION FOR CHANGE OVER TO RESERVE PATH :
ACTIVE > REESERVE

NETWORK MONITORING AND CONTROLLING APPARATUS

This is a continuation of International PCT Application NO. PCT/JP01/07904, filed Sep. 12, 2001, which was not published in English.

BACKGROUND OF THE INVENTION

1. Field of the Invention

The present invention relates to a network monitoring and controlling apparatus that collects quality information in a transmission network.

2. Description of the Related Art

In the case of a transmission network such as an SDH (Synchronous Digital Hierarchy) network, a SONET (Synchronous Optical network) or the like, frame data inputted from a low-speed line of a terminal or the like is outputted through a high-speed line to a low-speed line. An input channel of a transmission apparatus where the frame data is inputted from the low-speed line to the transmission network is referred to as an entrance point; an output channel of a transmission apparatus where the frame data is outputted to the low-speed line is referred to as an exit point; and input and output channels of transmission apparatus relaying the frame data are referred to as path via points. A logical communication path connecting the entrance point with the exit point and extending over a plurality of transmission apparatus is referred to as a path.

The points on the path are set as cross connect information in the corresponding transmission apparatus. The transmission network has a redundant structure such as a ring structure or the like from a viewpoint of improving reliability. For each path, an active path and a reserve path are set. The active path refers to a path through which frame data outputted by the transmission apparatus at the output point passes. The reserve path refers to a path that has an intermediate path different from that of the active path and through which frame data not outputted by the transmission apparatus at the output point passes. A network monitoring and controlling apparatus is provided to collect quality information in the transmission network and change over from the active path to the reserve path.

Conventionally, an operator instructs the network monitoring and controlling apparatus to collect quality information of each active path, and determines whether there is quality deterioration. When there is quality deterioration, the operator determines whether to change over to the reserve path. The operator then instructs the network monitoring and controlling apparatus to change over to the reserve path.

However, the conventional network monitoring and controlling apparatus has the following problems.

(1) As described above, the operator refers to quality information, determines whether to change over, and performs the changeover for each path. Hence, there is a fear of the operator being late in noticing quality deterioration. If the operator is late in noticing quality deterioration, there is a high possibility of an interruption of communication before switching the path, which is very hazardous for network management.

(2) Even when the operator recognizes the quality deterioration of an active path, the operator needs to collect information again in order to grasp a state of quality of a reserve path, and thus takes time to determine whether changeover to the reserve path is necessary.

(3) Known examples of monitoring line quality and changing over from an active path to a reserve path depending on the state of quality include Japanese Patent Laid-Open No. Hei 7-321882 "METHOD AND DEVICE FOR MONITORING LINE IN MODEM NETWORK WITH MONITORING FUNCTION," Japanese Patent Laid-Open No. 2000-83036 "METHOD AND DEVICE FOR CONTROLLING DATA TRANSFER," Japanese Patent Laid-Open No. 2000-151607 "IP PACKET COMMUNICATION DEVICE AND OPTICAL NETWORK," and the like. All these examples only monitor quality of the active path and change over to the reserve path depending on a result of monitoring the quality of the active path. Since the examples do not monitor quality of the reserve path, even when the line quality of the reserve path is lower than the line quality of the active path, the changeover is performed without knowing that the line quality of the reserve path is lower than the line quality of the active path.

(4) Further, for each path, quality information of input and output points of transmission apparatus for forming paths of the path is collected. Therefore a load on the network is increased. In order to avoid the problem by reducing the load, it is necessary to collect quality information of only the input and output points of the path. However, a problem of trade-off is presented, in that at a time of occurrence of quality deterioration, in order to identify a point causing the quality deterioration, the operator needs to collect quality information of input points of all the transmission apparatus on the path, and is thus late in determining whether to perform changeover.

SUMMARY OF THE INVENTION

It is accordingly an object of the present invention to provide a network monitoring apparatus that improves reliability of a network without increasing a traffic load.

In accordance with an aspect of the present invention, there is provided a network monitoring and controlling apparatus for monitoring and controlling a transmission network formed by a plurality of transmission apparatus, the network monitoring and controlling apparatus including: a path information storing unit for storing path information on an entrance point for inputting data, an exit point for outputting the data, and path via points for relaying the data, regarding a path through which the data passes and which path connects a transmission apparatus for inputting the data to the transmission network with a transmission apparatus for outputting the data from the transmission network; a quality information periodic collection unit for periodically collecting quality information of a channel corresponding to the entrance point and a channel corresponding to the output point; a quality deterioration detecting unit for determining whether or not quality of the path is deteriorated on the basis of the quality information of the entrance point and the exit point; a path via point searching unit for, when the quality of the path is deteriorated, searching the path information storing unit and obtaining information on the path via points of the path deteriorated in quality; a path via point quality information collection unit for collecting quality information of channels corresponding to the path via points on the basis of the information on the path via points; and a quality deterioration point identifying unit for determining whether or not a deteriorated path via point is present on the basis of the quality information of the path via points.

Preferably, the path includes an active path and a reserve path, and the path via point quality information collection unit collects quality information of channels associated with path via points of the active path and the reserve path.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 5 is a diagram of structure of a path information storing unit in FIG. 4;

FIG. 6 is a diagram of structure of a quality information storing unit in FIG. 4;

FIG. 7 is a diagram of a quality deterioration determining method;

FIG. 8 is a diagram of a quality deterioration determining method;

FIG. 9 is a diagram of a quality deterioration determining method;

FIG. 10 is a diagram of a quality deterioration determining method;

FIG. 11 is a diagram of a condition for changeover to a reserve path;

FIG. 12 is a diagram of a condition for changeover to the reserve path;

FIG. 13 is a diagram of a condition for changeover to the reserve path;

FIG. 14 is a diagram of a condition for changeover to the reserve path;

FIG. 16A is a diagram showing quality information of an entrance point and an exit point;

FIG. 16B is a diagram showing quality information of an active path; and

FIG. 16C is a diagram showing quality information of the reserve path.

DETAILED DESCRIPTION OF THE PREFERRED EMBODIMENTS

Figure 1:
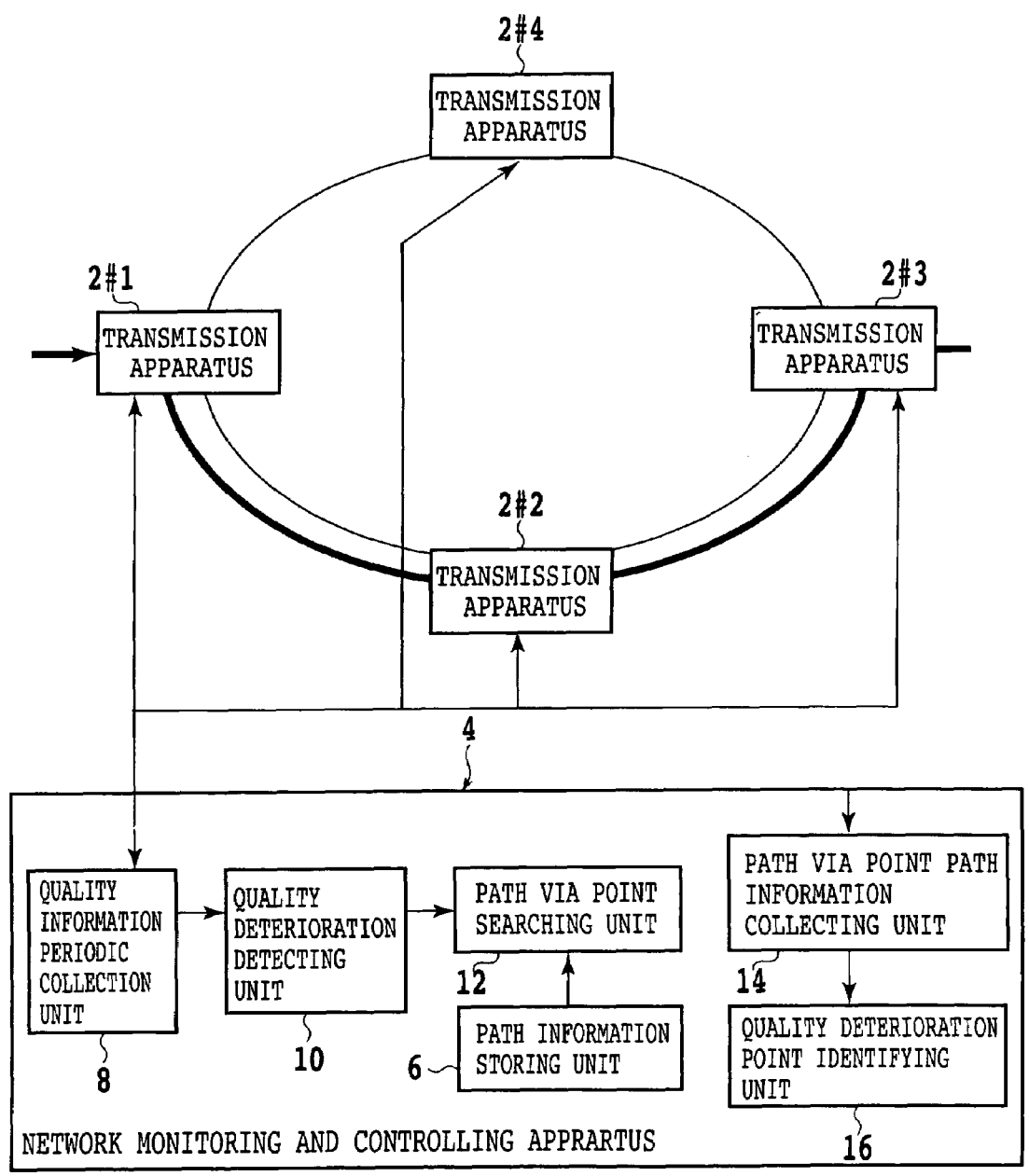
FIG. 1 is a diagram of assistance in explaining principles of the present invention.

Principles of the present invention will be described prior to description of an embodiment of the present invention. FIG. 1 is a diagram of assistance in explaining principles of the present invention. As shown in FIG. 1, a transmission network includes a plurality of transmission apparatus 2#$i$ ($i$=1, 2, . . . ) and a network monitoring and controlling apparatus 4. The network monitoring and controlling apparatus 4 has a path information storing unit 6, a quality information periodic collection unit 8, a quality deterioration detecting unit 10, a path via point searching unit 12, a path via point quality information collecting unit 14, and a quality deterioration point identifying unit 16. The quality information periodic collection unit 8 stores path information on an entrance point for inputting data, an exit point for outputting the data, and path via points for relaying the data, regarding a path through which the data passes, which path connects a transmission apparatus for inputting the data to the transmission network with a transmission apparatus for outputting the data from the transmission network.

The quality information periodic collection unit 8 automatically and periodically collects quality information of a channel corresponding to the entrance point and a channel corresponding to the exit point. At this time, quality information of only the entrance point and the exit point rather than all the points of the path is collected to suppress increase in traffic due to the connection of quality information. The quality deterioration detecting unit 10 determines on the basis of the quality information of the entrance point and the exit point whether quality of the path is deteriorated. When the quality deterioration detecting unit 10 determines that the quality of the path is deteriorated, the path via point searching unit 12 searches the path information storing unit 6 to obtain information on path via points of the path deteriorated in quality. On the basis of the information on the path via points, the path via point quality information collecting unit 14 collects quality information of channels corresponding to the path via points. On the basis of the quality information of the path via points, the quality deterioration point identifying unit 16 determines presence or absence of a deteriorated path via point. It is thus possible to change over to a reserve path only when quality is deteriorated at the path via point, and therefore eliminate unnecessary changeover. In addition, since the determination for changing over to the reserve path can be made automatically, the changeover can be made without delay.

Figure 2:
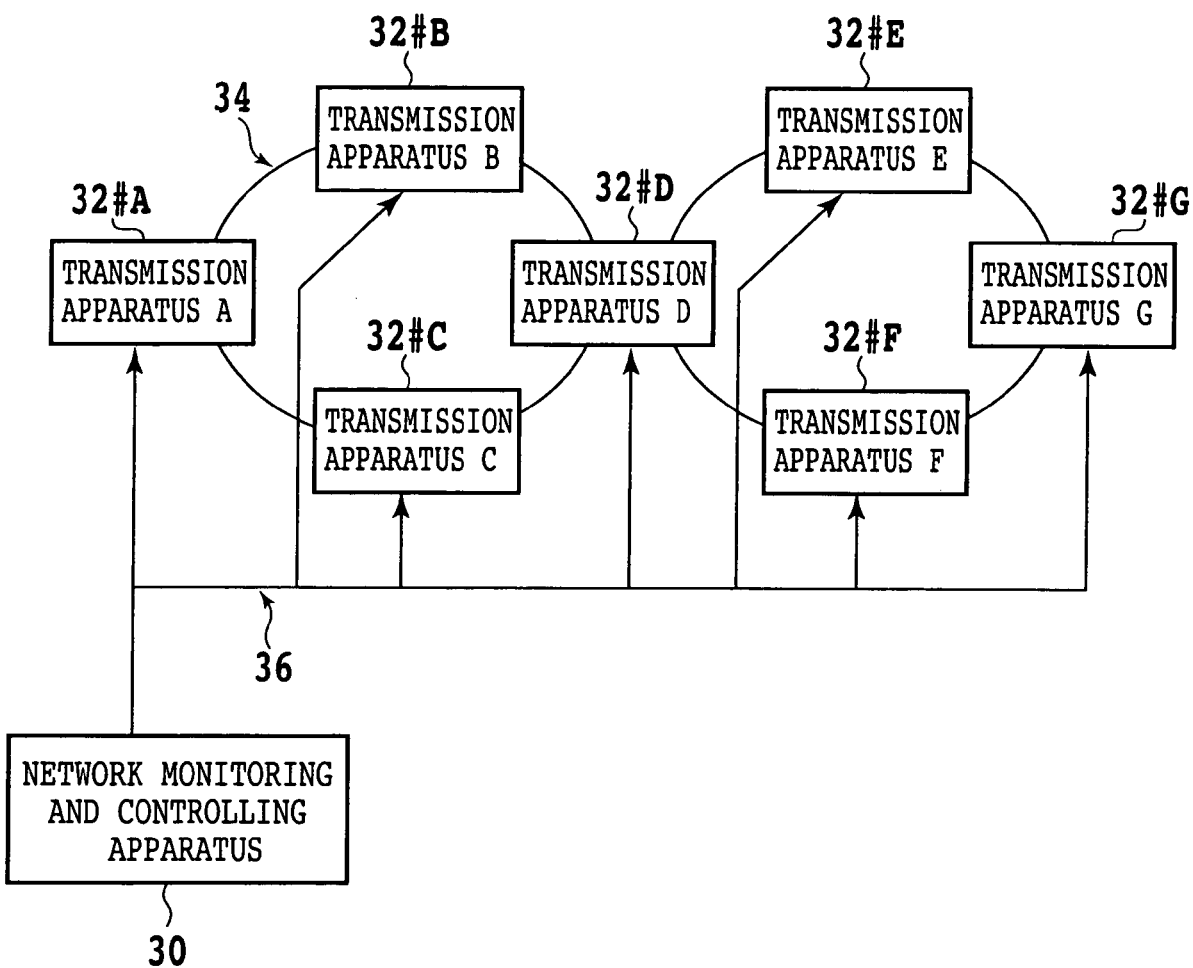
FIG. 2 is a diagram showing a transmission network according to an embodiment of the present invention.

FIG. 2 is a diagram of configuration of a transmission network according to an embodiment of the present invention. As shown in FIG. 2, the transmission network comprises a network monitoring and controlling apparatus 30, a plurality of transmission apparatus 32#$i$ ($i$=A, B, C, . . . ), and transmission lines 34 and 36. The transmission network transmits frame data and the like. The transmission network needs to be configured with a redundancy by an active path and a reserve path. However, there is no limitation to topology of the network; in the present embodiment, description will be made by taking a ring network as an example. The network monitoring and controlling apparatus 30 has the following functions.

(1) The network monitoring and controlling apparatus 30 performs path setting on each transmission apparatus 32#$i$. The path setting refers to setting of a relation between an input channel and an output channel for a path in a transmission apparatus 32#$i$ on an active path and a reserve path connecting a transmission apparatus at an entrance of the path and a transmission apparatus at an exit of the path. An input channel refers to a channel as a cross connect unit assigned to an input-output line. An output channel refers to a channel corresponding to an output frame when a frame of the input channel is mapped to the output frame.

Figure 3:
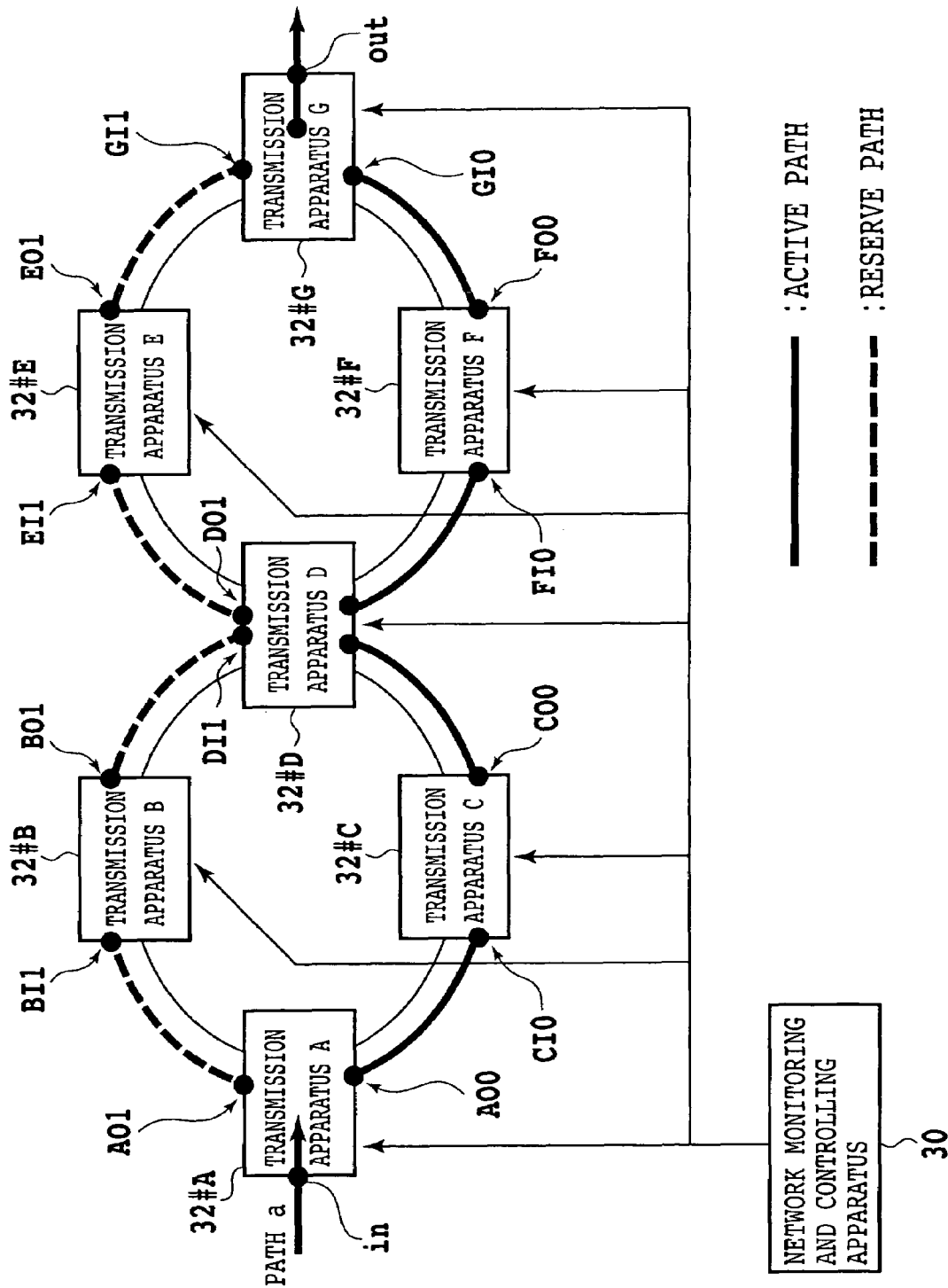
FIG. 3 is a diagram showing an example of paths.

FIG. 3 is a diagram showing an example of paths. As shown in FIG. 3, in a path a, an entrance point In is a transmission apparatus 32#A; an exit point Out is a transmission apparatus 32#G; points on an intermediate path of an active path are an output point AO0 of the transmission apparatus 32#A, an input and an output point CI0 and CO0 of a transmission apparatus 32#C, an input and an output point DI0 and DO0 of a transmission apparatus 32#D, an input and an output point FI0 and FO0 of a transmission apparatus 32#F, and an output point GO0 of the transmission apparatus 32#G; and points on an intermediate path of a reserve path are an output point AO1 of the transmission apparatus 32#A, an input and an output point BI1 and BO1 of a transmission apparatus 32#B, an input and an output point DI1 and DO0 of the transmission apparatus 32#D, an input and an output point EI1 and EO0 of a transmission apparatus 32#E, and an output point GO0 of the transmission apparatus 32#G.

(2) The network monitoring and controlling apparatus 30 collects quality information from the transmission apparatus 32#i at the entrance point and the exit point of each path. The quality information refers to communication quality of a channel of a path, and is obtained by counting a number of frames (SDH/SONET) where an error occurs, a number of bit errors, and a number of non-communications, for example. The number of error frames is calculated on the basis of information included in overheads of frames. Frames judged to be error frames at the time of input are handled as invalid frames at an output channel, and the number of non-communications refers to a number of such invalid frames. The quality information is generally collected automatically at fixed periods. Incidentally, the active path and the reserve path have the same entrance point and the same exit point. The quality information is collected only from the entrance point and the exit point, and the path via points are excluded, so that increase in traffic due to the collection is suppressed.

(3) By comparing the quality information of the entrance point and the exit point of each path, the network monitoring and controlling apparatus 30 determines whether the exit point is deteriorated in communication quality as compared with the entrance point. In general, since data for a path is inputted at the entrance point and then outputted at the exit point, effects of deterioration of communication quality at path via points are accumulated at the exit point, and thus quality at the exit point is deteriorated as compared with the entrance point. For example, the number of error frames, the number of error bits, and the number of non-communications are increased cumulatively as frames are relayed. Such quality information at the exit point is a numerical value that is not decreased as compared with quality information at the entrance point. By comparing the numerical values of quality information of the entrance point and the exit point with each other, the network monitoring and controlling apparatus 30 can determine whether the communication quality is deteriorated.

(4) For each path, when the exit point is deteriorated in quality as compared with the entrance point, the network monitoring and controlling apparatus 30 collects quality information of path via points of the active path about the path. One of an input point and an output point suffices as a path via point from which to collect the quality information; for example, the path via points are input points.

(5) The network monitoring and controlling apparatus 30 identifies a path via point deteriorated in quality on the basis of the quality information of the path via points of the active path. The relay point deteriorated in quality is identified because when no deteriorated path via point is identified, the deterioration in quality of the active path is caused by the transmission apparatus at the exit point, and the transmission apparatus at the path via points of the active path and the transmission line of the active path are not considered to have a problem, so that changeover to the reserve path is not likely to solve the quality deterioration.

(6) When a path via point deteriorated in quality is identified, the network monitoring and controlling apparatus 30 collects quality information of path via points of the reserve path of the path. The network monitoring and controlling apparatus 30 compares the quality information of the path via points of the reserve path with the quality information of the path via points of the active path, and thereby determines whether the reserve path is better in quality than the active path.

(7) When the network monitoring and controlling apparatus 30 determines that the reserve path is better in quality than the active path, the network monitoring and controlling apparatus 30 changes over to the reserve path. For example, the network monitoring and controlling apparatus 30 instructs the transmission apparatus at the exit point of the path to change over to the reserve path.

The transmission apparatus 32#i has the following functions.

(1) The transmission apparatus 32#i performs path setting according to path information transmitted from the network monitoring and controlling apparatus 30.

(2) The transmission apparatus 32#i cross-connects a frame of an input channel to a corresponding output channel according to the path setting, and transmits the output frame to the transmission line 34. At this time, when the transmission apparatus 32#i is the entrance point of the path, the transmission apparatus 32#i transmits a frame received at the entrance point to the transmission lines corresponding to the active path and the reserve path. When the transmission apparatus 32#i is the exit point of the path, the transmission apparatus 32#i selects a frame in the active path, and transmits the frame to a transmission line.

(3) When the transmission apparatus 32#i is a point of the path, the transmission apparatus 32#i collects quality information of the point. For example, the transmission apparatus 32#i collects as quality information a sum of the number of error frames, the number of error bits, and the number of non-communications at the input point on the path.

(4) When the network monitoring and controlling apparatus 30 instructs the transmission apparatus 32#i to transmit the quality information of the path point, the transmission apparatus 32#i transmits the quality information of the specified point to the network monitoring and controlling apparatus 30. The points includes the entrance point of the path, the exit point of the path, the path via points of the active path, and the path via points of the reserve path.

(5) When the transmission apparatus 32#i is the exit point of the path, the transmission apparatus 32#i changes over from the active path to the reserve path according to an instruction from the network monitoring and controlling apparatus 30.

The transmission line 34 connects between the transmission apparatus 32#i (i=A to G), and is an optical fiber, for example. The transmission line 36 connects between the network monitoring and controlling apparatus 30 and the transmission apparatus 32#i (i=A to G). The network monitoring and controlling apparatus 30 may be connected directly to all the transmission apparatus 32#i via a LAN, or may be connected to one transmission apparatus via a LAN and connected to the other transmission apparatus via the transmission line 34. When the network monitoring and controlling apparatus 30 is connected to the other transmission apparatus via the transmission line 34, information is transmitted by using for example SDH overheads or the like.

Figure 4:
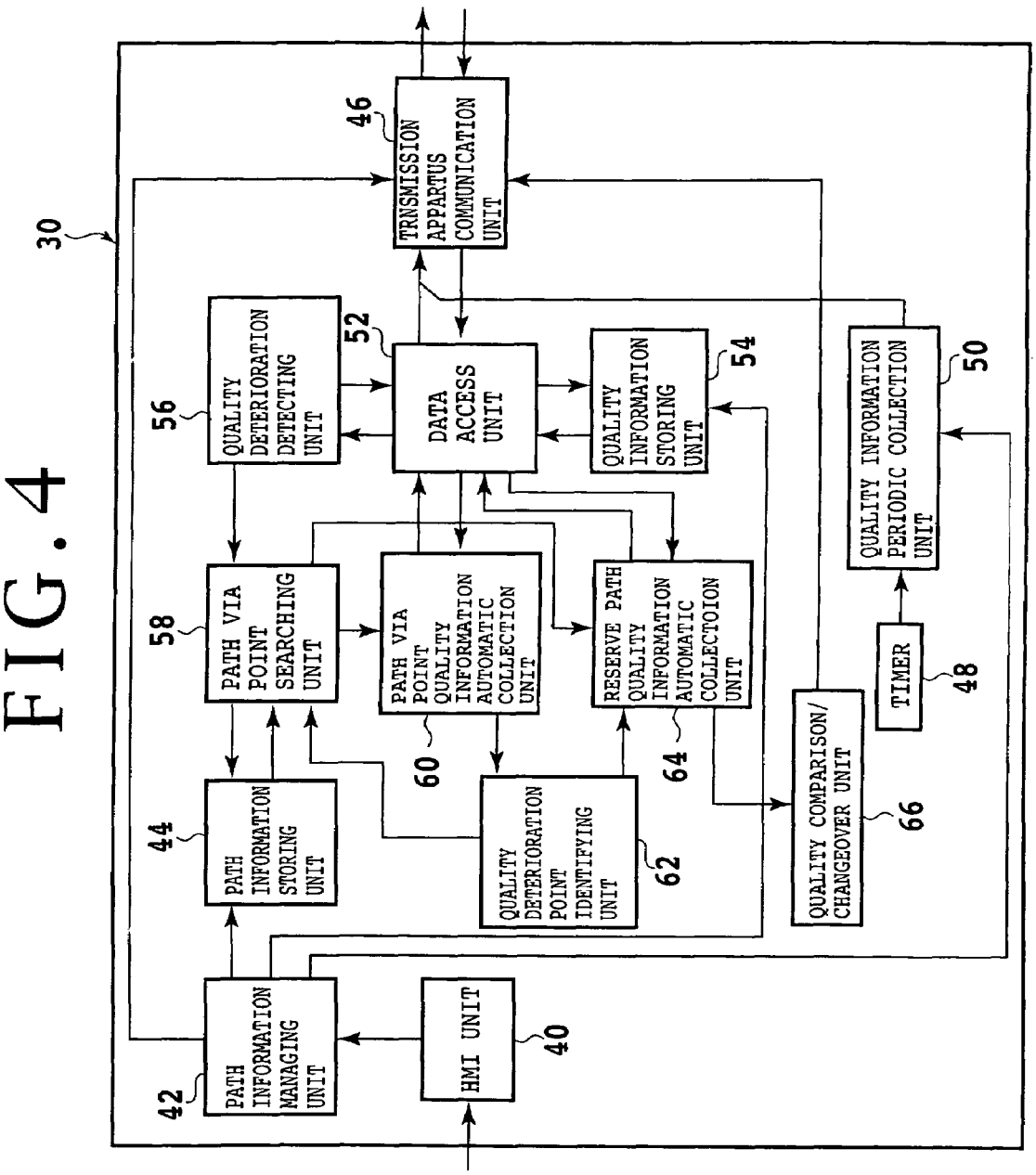
FIG. 4 is a block diagram of a network monitoring and controlling apparatus in FIG. 2.

FIG. 4 is a block diagram of the network monitoring and controlling apparatus 30 in FIG. 2. As shown in FIG. 4, the network monitoring and controlling apparatus 30 has an HMI unit 40, a path information managing unit 42, a path information storing unit 44, a communication unit 46 for communication with transmission apparatus, a timer 48, a quality information periodic collection unit 50, a data access unit 52, a quality information storing unit 54, a quality deterioration detecting unit 56, a path via point searching unit 58, a path via point quality information automatic collection unit 60, a quality deterioration point identifying unit 62, a reserve path quality information automatic collection unit 64, and a quality comparison/changeover unit 66. The HMI unit 40 controls a human-machine interface for setting of path information and the like. When receiving path information inputted from a console not shown in the figure by a person in charge of maintenance, the HMI unit 40 outputs the path information to the path information managing unit 42. The path information is information on a path name, the entrance point of the path, the exit point of the path, and the path via points of the active path and the reserve path. The path information managing unit 42 has the following functions.

(1) When receiving the path information inputted by the maintenance person from the HMI unit 40, the path information managing unit 42 writes to the path information storing unit 44 information on the path via points of the active path and the reserve path, which information is for collecting quality information of the path.

(2) When receiving the path information inputted by the maintenance person from the HMI unit 40, the path information managing unit 42 transmits line information for cross connection to the transmission apparatus 32#i serving as the input and output points of the path and the path via points.

(3) When receiving the path information inputted by the maintenance person from the HMI unit 40, the path information managing unit 42 outputs input and output point information for collecting quality information of the input and output points of the path to the quality information periodic collection unit 50.

(4) When receiving the path information inputted by the maintenance person from the HMI unit 40, the path information managing unit 42 instructs the transmission apparatus communication unit 46 to set the path information.

(5) When receiving the path information inputted by the maintenance person from the HMI unit 40, the path information managing unit 42 stores the path information such as the path name and the like for storing quality information in the quality information storing unit 54. Incidentally, when the path information includes conditions for determining quality deterioration of the path, or conditions for changing over from the active path to the reserve path, for example a threshold value, a consecutive number, and a total number to be described later, the path information managing unit 42 stores the conditions for changing over from the active path to the reserve path in the quality information storing unit 54. This is to allow flexible management by setting conditions for determining path quality deterioration, or conditions for changing over to a reserve path for each path.

The path information storing unit 44 is a memory for storing information on the entrance point of the path, the exit point of the path, and the path via points of the active path and the reserve path.

FIG. 5 is a diagram showing an example of structure of the path information storing unit 44. The path information storing unit 44 stores, for each path, the name of the path, information on transmission apparatus on an active path of the path, and information on transmission apparatus on a reserve path of the path. As shown in FIG. 5, the path information storing unit 44 stores, for the path a, for example, information on the transmission apparatus 32#C, 32#D, and 32#F at the points on the intermediate path of the active path, and information on the transmission apparatus 32#B, 32#D, and 32#E at the points on the intermediate path of the reserve path. The transmission apparatus communication unit 46 performs communication with the transmission apparatus 32#i, and has the following functions.

(1) According to a request from the path information managing unit 42, the transmission apparatus communication unit 46 performs path setting on transmission apparatus 32#i located on a path.

(2) According to a request from the quality information periodic collection unit 50, the transmission apparatus communication unit 46 instructs transmission apparatus 32#i at an entrance point and an exit point of each path to transmit quality information.

(3) According to a request from the data access unit 52, the transmission apparatus communication unit 46 instructs transmission apparatus 32#i at the path via points of an active path to transmit quality information.

(4) According to a request from the data access unit 52, the transmission apparatus communication unit 46 instructs transmission apparatus 32#i at the path via points of a reserve path to transmit quality information.

(5) According to a request from the quality comparison/changeover unit 66, the transmission apparatus communication unit 46 instructs a transmission apparatus 32#i at the exit point of a path to change over from an active path to a reserve path.

Each time a fixed time passes, the timer 48 notifies the passage of the fixed time to the quality information periodic collection unit 50. The quality information periodic collection unit 50 has the following functions.

(1) The quality information periodic collection unit 50 stores information outputted from the path information managing unit 42 on transmission apparatus 32#i at an entrance point and an exit point for periodically collecting quality information of the path.

(2) When the passage of the fixed time is notified from the timer 48, the quality information periodic collection unit 50 retrieves information on an entrance point and an exit point of a path for next collection, and requests the transmission apparatus communication unit 46 to instruct corresponding transmission apparatus 32#i to transmit quality information of the entrance point and the exit point.

The data access unit 52 has the following functions.

(1) When receiving quality information of an entrance point and an exit point of a path from the transmission apparatus communication unit 46, the data access unit 52 stores the quality information in the quality information storing unit 54, and outputs the quality information to the quality deterioration detecting unit 56.

(2) The data access unit 52 notifies the transmission apparatus communication unit 46 of an instruction from the path via point quality information automatic collection unit 60 to transmit quality information of path via points of an active path.

(3) When receiving the quality information of the path via points of the active path from the transmission apparatus communication unit 46, the data access unit 52 stores the quality information in the quality information storing unit 54 and outputs the quality information to the path via point quality information automatic collection unit 60.

(4) The data access unit 52 notifies the transmission apparatus communication unit 46 of an instruction from the reserve path quality information collection unit 64 to transmit quality information of path via points of a reserve path.

(5) When receiving the quality information of the path via points of the reserve path from the transmission apparatus communication unit 46, the data access unit 52 stores the quality information in the quality information storing unit 54 and outputs the quality information to the reserve path quality information collection unit 64.

FIG. 6 is a diagram of structure of the quality information storing unit 54 in FIG. 3. As shown in FIG. 6, the quality information storing unit 54 stores, for each path, quality information of an entrance point and an exit point, quality information of path via points of an active path, quality information of path via points of a reserve path, information for determining quality deterioration, for example (entrance−exit) quality information, and information on whether there is deterioration in quality at a present time, the present time−T×1 (T: a quality information collecting period for the path), . . . , the present time−T×n.

The information for determining quality deterioration is obtained from the quality information of the exit and the quality information of the entrance, for determining whether quality of the exit point is deteriorated as compared with quality of the entrance point. The quality information is not limited to the present time, and the past quality information at the present time−T×1, . . . , the present time−T×n is retained in order to determine quality deterioration at the present time on the basis of the quality information at the present time and in the past and thereby prevent changeover to the reserve path of the path because of temporary quality deterioration. The quality deterioration detecting unit 56 has the following functions.

(1) When receiving quality information of an entrance point and an exit point of a path from the data access unit 52, the quality deterioration detecting unit 56 calculates quality deterioration determining information, for example (entrance−exit) quality, and then stores the information in the quality information storing unit 54.

(2) The quality deterioration detecting unit 56 determines whether there is quality deterioration from the quality deterioration determining information at the present time and in the past, and then stores the information of whether there is quality deterioration in the quality information storing unit 54. The following cases are considered as examples of a method for determining whether there is quality deterioration.

(i) FIG. 7 is a diagram representing an example of the quality deterioration determining method. As shown in FIG. 7, the quality deterioration detecting unit 56 determines that there is quality deterioration when the (entrance−exit) quality at the present time is negative. For example, when quality information of the entrance is 0 and quality information of the exit is 3 at the present time and (present−T1×1), the (entrance−exit) quality is −3 (=0-3), and therefore the quality deterioration detecting unit 56 determines that there is quality deterioration at the present time and (present−T1×1).

(ii) FIG. 8 is a diagram representing an example of the quality deterioration determining method. As shown in FIG. 8, the quality deterioration detecting unit 56 determines that there is quality deterioration when the (entrance−exit) quality at the present time is lower than a threshold value. The threshold value is intended to prevent possibility of frequently determining that there is quality deterioration and changing over to the reserve path when the changeover is not necessarily required, if the threshold value is too severe. Thus, an appropriate value in accordance with the application is set as the threshold value. For example, the threshold value is −5. When the threshold value is −5 and the (entrance−exit) quality is −3 at the present time, −8 at (present−T1×1), and −3 at (present−T1×2), for example, the quality deterioration detecting unit 56 determines that there is no quality deterioration at the present time and (present−T1×2) when the (entrance−exit) quality is −3, and the quality deterioration detecting unit 56 determines that there is quality deterioration at (present−T1×1) when the (entrance−exit) quality is −8. The ability to set an arbitrary threshold value for the quality deterioration determination allows flexible management in which design can be made in consideration of a difference in quality between the entrance point and the exit point, which difference varies depending on a number of transmission apparatus and length of a transmission line, for example.

(iii) FIG. 9 is a diagram representing an example of the quality deterioration determining method. As shown in FIG. 9, the quality deterioration detecting unit 56 determines that there is quality deterioration when the (entrance−exit) quality at the present time is lower than a threshold value a certain consecutive number of times or more, for example twice or more. The quality deterioration detecting unit 56 determines that there is quality deterioration when the (entrance−exit) quality is lower than the threshold value the certain consecutive number of times or more in order to exclude transient cases. For example, when the threshold value is −5, and a quality deterioration determining condition is that the (entrance−exit) quality be lower than the threshold value two consecutive times, the (entrance−exit) quality at (present−T1×1) and (present−T1×2) is −8 and is thus lower than the threshold value (=−5) two consecutive times, and therefore the quality deterioration detecting unit 56 determines that there is quality deterioration at (present−T1×1). The ability to set arbitrarily the threshold value for the quality deterioration determination and the number of consecutive times the (entrance−exit) quality is lower than the threshold value allows flexible management in which design can be made in consideration of a difference in quality between the entrance point and the exit point, which difference varies depending on a number of transmission apparatus and length of a transmission line, for example.

(iv) FIG. 10 is a diagram representing an example of the quality deterioration determining method. As shown in FIG. 10, the quality deterioration detecting unit 56 determines that there is quality deterioration when the (entrance−exit) quality at the present time is lower than a threshold value a certain number of times or more in total within a certain number of collections. For example, the quality deterioration detecting unit 56 determines that there is quality deterioration when the (entrance−exit) quality is lower than the threshold value twice or more in total within four collections. The quality deterioration detecting unit 56 determines that there is quality deterioration in such a case in order to exclude transient cases. For example, when the (entrance−exit) quality at the present time, (present−T1×1), (present−T1×2), and (present−T1×3) is −3, −8, 0, and −8, respectively, and the quality deterioration detecting unit 56 determines that there is quality deterioration when the (entrance−exit) quality is lower than the threshold value twice or more in total within four collections, the quality deterioration detecting unit 56 determines that there is quality deterioration at the present time and (present−T1×1). The ability to set arbitrarily the threshold value for the quality deterioration determination and the total number of times the (entrance−exit) quality is lower than the threshold value allows flexible management in which design can be made in consideration of a difference in quality between the entrance point and the exit point, which difference varies depending on a number of transmission apparatus and length of a transmission line, for example.

(3) When there is quality deterioration, the quality deterioration detecting unit 56 notifies the path via point searching unit 58 that the quality of the path is deteriorated.

The path via point searching unit 58 has the following functions.

(1) When the deterioration in the quality of the path is notified from the quality deterioration detecting unit 56, the path via point searching unit 58 searches the path information storing unit 44 using a name of the path as an index to obtain path via points of an active path of the path. The path via point searching unit 58 outputs the obtained path via points to the path via point quality information automatic collection unit 60.

(2) When the quality deterioration point identifying unit 62 notifies the path via point searching unit 58 that a path via point of the deteriorated active path is identified, the path via point searching unit 58 searches the path information storing unit 44 using the name of the path as an index to obtain path via points of a reserve path of the path. The path via point searching unit 58 then outputs the obtained path via points to the reserve path quality information automatic collection unit 64.

The path via point quality information automatic collection unit 60 has the following functions.

(1) When the path via points of the active path are outputted from the path via point searching unit 58 to the path via point quality information automatic collection unit 60, the path via point quality information automatic collection unit 60 requests the data access unit 52 to collect quality information of the path via points. When a transmission apparatus 32#*i* is a path via point, as shown in FIG. 4, two points, that is, an input point and an output point are defined; however, a point for collection is either one of the points, for example the input point.

(2) The path via point quality information automatic collection unit 60 reads the quality information of the path via points of the active path, which information is stored in the quality information storing unit 54, via the data access unit 52, and then outputs the quality information to the quality deterioration point identifying unit 62.

The quality deterioration point identifying unit 62 has the following functions.

(1) The quality deterioration point identifying unit 62 identifies a point deteriorated in quality from the quality information of the path via points of the active path, which information is outputted from the path via point quality information automatic collection unit 60. In identifying the point deteriorated in quality, the quality deterioration point identifying unit 62 determines that quality is deteriorated at the point when (i) the quality becomes positive for the first time at the point or when (ii) the quality exceeds a threshold value for the first time at the point in a direction of flow of a signal in the path. Incidentally, the threshold value may be different from the threshold value used for quality deterioration determination by the quality deterioration detecting unit 56.

(2) When the point deteriorated in quality is identified, the quality deterioration point identifying unit 62 notifies the path via point searching unit 58 and the reserve path quality information automatic collection unit 64 that the point deteriorated in quality is identified.

The reserve path quality information automatic collection unit 64 has the following functions.

(1) When the quality deterioration point identifying unit 62 notifies the reserve path quality information automatic collection unit 64 that the point deteriorated in quality is identified and the path via point searching unit 58 outputs the path via points of the reserve path to the reserve path quality information automatic collection unit 64, the reserve path quality information automatic collection unit 64 requests the data access unit 52 to collect quality information of the path via points.

(2) The reserve path quality information automatic collection unit 64 outputs to the quality comparison/changeover unit 66 the quality information of the path via points of the active path and the reserve path, which information is outputted from the data access unit 52 and stored in the quality information storing unit 54.

The quality comparison/changeover unit 66 has the following functions.

(1) The quality comparison/changeover unit 66 for example calculates a maximum value or a total value of the quality information of the path via points of each of the active path and the reserve path from the quality information at the present time of the path via points of the active path and the path via points of the reserve path. The quality comparison/changeover unit 66 then stores a difference between the maximum value or the total value of the active path and the maximum value or the total value of the reserve path (hereinafter referred to as active−reserve) in the quality information storing unit 54.

(2) The quality comparison/changeover unit 66 determines from active−reserve whether the active path is deteriorated in quality as compared with the reserve path, and stores a result of the determination in the quality information storing unit 54. The active path is deteriorated in quality as compared with the reserve path, the following cases are considered as conditions for changing over to the reserve path.

(i) FIG. 11 is a diagram representing an example of a determining method for changeover to the reserve path. As shown in FIG. 11, the quality comparison/changeover unit 66 determines that the active path is deteriorated in quality when active−reserve exceeds a threshold value. When the threshold value is 7, for example, (active−reserve) at (present−T1×1) is 8, which exceeds the threshold value of 7, and therefore the quality comparison/changeover unit 66 determines that the active path is deteriorated in quality as compared with the reserve path. In a case of a system involving instantaneous interruption at a time of changeover, for example, the ability to set arbitrarily the changeover threshold value allows flexible management, in which an optimum changeover threshold value for the system to be transmitted can be set in consideration of improvement in quality after the changeover and the instantaneous interruption at the time of changeover. The setting of the optimum threshold value prevents changeover from being performed again as a result of instantaneous interruption at a time of changeover.

(ii) FIG. 12 is a diagram representing an example of the determining method for changeover to the reserve path. As shown in FIG. 12, the quality comparison/changeover unit 66 determines that the active path is deteriorated in quality when the active−reserve value exceeds a threshold value a certain consecutive number of times or more. For example, when (active−reserve) at the present time is 8, (active−reserve) at (present−T1×1) is 8, and (active−reserve) at (present−T1×2) is 3, the threshold value is 5, and there is a condition that active−reserve exceed the threshold value consecutively, the quality comparison/changeover unit 66 determines that the active path is deteriorated in quality as compared with the reserve path at the present time. In a case of a system involving instantaneous interruption at a time of changeover, for example, the ability to set arbitrarily the changeover threshold value and the count value for performing changeover allows flexible management, in which an optimum changeover threshold value and an optimum count value for the the system to be transmitted can be set in consideration of improvement in quality after the changeover and the instantaneous interruption at the time of changeover. The setting of the optimum threshold value prevents changeover from being performed again as a result of instantaneous interruption at a time of changeover.

(iii) FIG. 13 is a diagram representing an example of the determining method for changeover to the reserve path. As shown in FIG. 13, the quality comparison/changeover unit 66 determines that the active path is deteriorated in quality when the active-reserve value becomes positive a certain consecutive number of times or more. For example, when (active-reserve) at the present time is 3, (active-reserve) at (present-T1×1) is 8, and (active-reserve) at (present-T1×2) is 8, and a condition that active-reserve is three consecutive times, the quality comparison/changeover unit 66 determines that the active path is deteriorated in quality as compared with the reserve path at the present time. In a case of a system involving instantaneous interruption at a time of changeover, for example, the ability to set arbitrarily the count value for performing changeover allows flexible management, in which an optimum count value for the system to be transmitted can be set in consideration of improvement in quality after the changeover and the instantaneous interruption at the time of changeover. The setting of the optimum threshold value prevents changeover from being performed again as a result of instantaneous interruption at a time of changeover.

(iv) FIG. 14 is a diagram representing an example of the determining method for changeover to the reserve path. As shown in FIG. 14, the quality comparison/changeover unit 66 determines that the active path is deteriorated in quality when the active-reserve value exceeds a threshold value a predetermined number of times or more within a certain number of times. For example, when (active-reserve) at the present time is 10, (active-reserve) at (present-T1×1) is 8, (active-reserve) at (present-T1×2) is 8, and (active-reserve) at (present-T1×3) is 10, the threshold value is 9, and there is a condition that (active-reserve) exceed the threshold value two times or more within four times, the quality comparison/changeover unit 66 determines that the active path is deteriorated in quality as compared with the reserve path at the present time. In a case of a system involving instantaneous interruption at a time of changeover, for example, the ability to set arbitrarily the changeover threshold value and the count value for performing changeover allows flexible management, in which an optimum changeover threshold value and an optimum count value for the system to be transmitted can be set in consideration of improvement in quality after the changeover and the instantaneous interruption at the time of changeover. The optimum setting of the threshold value and the count value prevents changeover from being performed again as a result of instantaneous interruption at a time of changeover.

(3) When the quality comparison/changeover unit 66 determines that the active path is deteriorated in quality as compared with the reserve path, the quality comparison/changeover unit 66 requests the transmission apparatus communication unit 46 to give an instruction to change over from the active path to the reserve path of the path.

Figure 15:
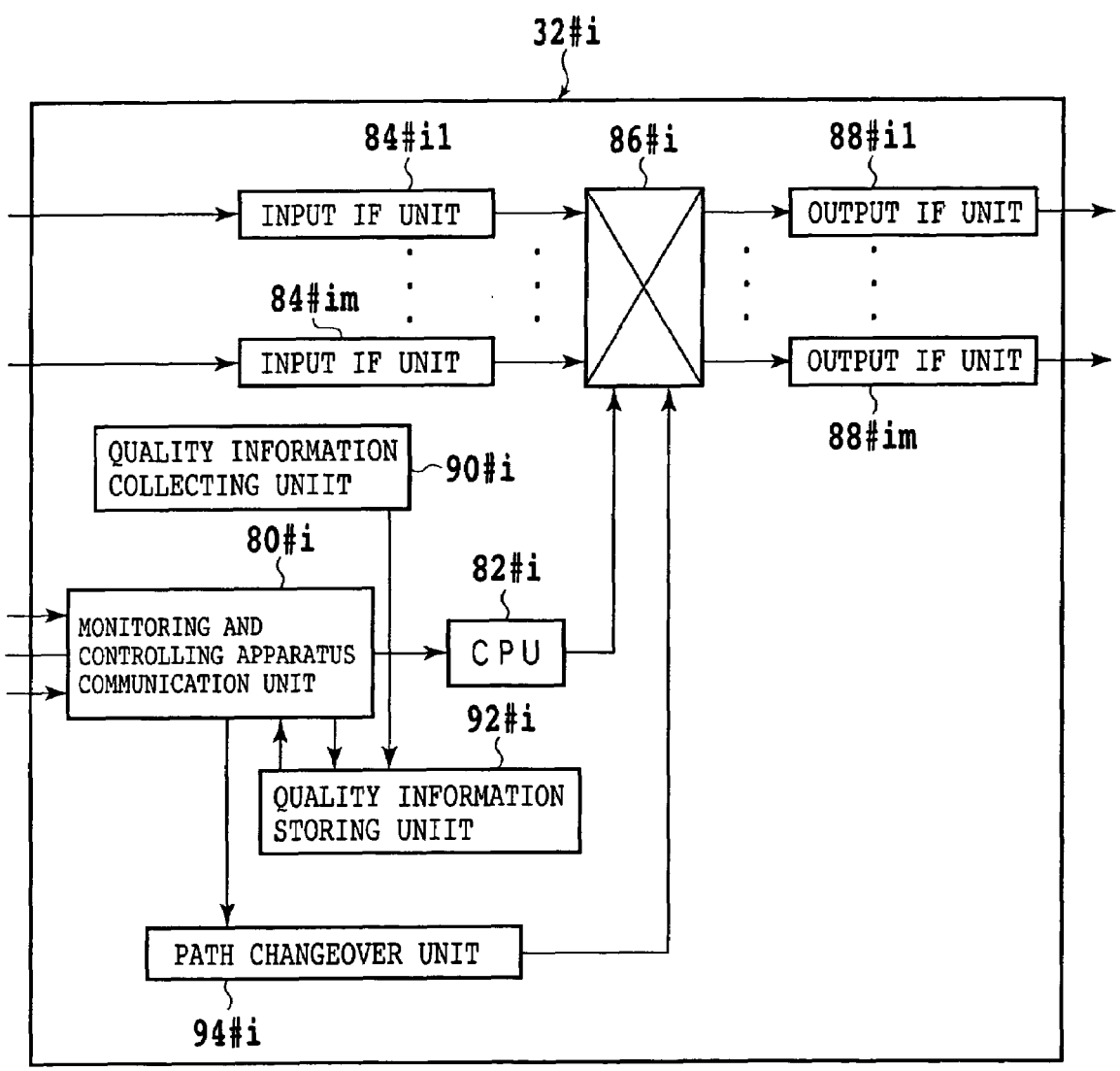
FIG. 15 is a block diagram of a transmission apparatus in FIG. 2.

FIG. 15 is a block diagram of a transmission apparatus 32#$i$ in FIG. 2. As shown in FIG. 15, the transmission apparatus 32#$i$ has a monitoring and controlling apparatus communication unit 80#$i$ for communication with the monitoring and controlling apparatus, a CPU 82#$i$, a plurality of input IF units 64#$ij$ (j=1 to m), a cross connect unit 86#$i$, a plurality of output IF units 88#$ij$ (j=1 to m), a quality information collecting unit 90#$i$, a quality information storing unit 92#$i$, and a path changeover unit 94#$i$. The monitoring and controlling apparatus communication unit 80#$i$ controls an interface with the network monitoring and controlling apparatus 30. The monitoring and controlling apparatus communication unit 80#$i$ has the following functions.

(1) When the transmission apparatus 32#$i$ is an entrance point, an exit point, a via point of an active path, or a path via point of a reserve path, the monitoring and controlling apparatus communication unit 80#$i$ receives cross connect information for the point from the network monitoring and controlling apparatus 30, and then outputs the cross connect information to the CPU 82#$i$. The cross connect information refers to information indicating a relation between an input channel and an output channel.

(2) When the transmission apparatus 32#$i$ is an entrance point, an exit point, a via point of an active path, or a path via point of a reserve path, and when the monitoring and controlling apparatus communication unit 80#$i$ receives a request to transmit quality information of the point from the network monitoring and controlling apparatus 30, the monitoring and controlling apparatus communication unit 80#$i$ reads quality information from the quality information storing unit 92#$i$, and then transmits the quality information to the network monitoring and controlling apparatus 30. Further, the monitoring and controlling apparatus communication unit 80#$i$ clears the quality information stored in the quality information storing unit 92#$i$.

(3) When the transmission apparatus 32#$i$ is an exit point of a path, and when the monitoring and controlling apparatus communication unit 80#$i$ receives a request to change over from an active path to a reserve path of the path from the network monitoring and controlling apparatus 30, the monitoring and controlling apparatus communication unit 80#$i$ notifies the request to the path changeover unit 94#$i$.

When the CPU 82#$i$ receives cross connect information of a path from the monitoring and controlling apparatus communication unit 80#$i$, the CPU 82#$i$ performs line setting on the cross connect unit 86#. The line setting refers to effecting control such that frame data of an input channel is mapped into frame data of a corresponding output channel. The input IF units 84#$i$ (i=1 to m) receive frame data of each input channel from the transmission line 34. The input IF units 84#$ij$ count and add together a number of error frames, a number of error bits, and a number of invalid frames for each input channel included in frames, and thereby obtain quality information. The input IF units 84#$ij$ output the quality information to the quality information collecting unit 90#$i$. Also, the input IF units 84#$ij$ output the frame data to the cross connect unit 86#$i$. Incidentally, error frames are set as invalid frames. The cross connect unit 86#$i$ has the following functions.

(1) According to the cross connect information set by the CPU 82#$i$, the cross connect unit 86#$i$ maps or demaps and outputs frame data of each channel inputted from the input IF unit 84#$i$ to the corresponding output channel of the corresponding output IF unit 88#$ij$.

(2) A case where the transmission apparatus 32#$i$ is an exit point of a path.

(i) The cross connect unit 86#$i$ selects frame data of an input channel corresponding to an active path, and outputs the frame data to an output channel of the corresponding output IF unit 88#$ij$.

(ii) When receiving an instruction to change over from the active path to a reserve path from the path changeover unit 94#$i$, the cross connect unit 86#$i$ selects frame data of an input channel corresponding to the reserve path, and outputs the frame data to the corresponding output IF unit 88#$ij$.

The output IF units 88#$ij$ transmit data frames outputted from the cross connect unit 84#$i$ to the transmission line 34. When receiving quality information of a point of a path from the input IF unit 84#$ij$, the quality information collecting unit 90#$i$ stores the quality information in a field corresponding to the path in the quality information storing unit 92#$i$. The quality information storing unit 92#$i$ is a memory for storing quality information of a point of each path. The quality information storing unit 92#$i$ stores the quality information in a field corresponding to information for identifying the point, for example a number of an input and an output channel, and information for identifying the path, for example a path name. When receiving a notification to change over from an active path to a reserve path of a path from the monitoring and controlling apparatus communication unit 80#$i$, the path changeover unit 94#$i$ instructs the cross connect unit 86#$i$ to change over from the active path to the reserve path.

Operation of FIG. 2 will be described in the following.

(1) Path Setting

When the HMI unit 40 in the network monitoring and controlling apparatus 30 receives path information inputted from a console not shown in the figure by the maintenance person, the HMI unit 40 outputs the path information to the path information managing unit 42. In the description below, suppose that as shown in FIG. 4, on the path, the transmission apparatus 32#A is the entrance point; the transmission apparatus 32#G is the exit point; the transmission apparatus 32#C, 32#D, and 32#F are the intermediate path points of the active path; and the transmission apparatus 32#B, 32#D, and 32#E are the intermediate path points of the active path. The path information managing unit 42 stores the path information in the path information storing unit 44, notifies the information on the transmission apparatus at the entrance point and the exit point to the quality information periodic collection unit 50, and requests the transmission apparatus communication unit 46 to set the path information. The transmission apparatus communication unit 46 transmits a message requesting the transmission apparatus 32#$i$ (i=A to G) on the path to set the path information to the transmission line 36.

When receiving the message requesting the transmission apparatus 32#$i$ to set the path information, the monitoring and controlling apparatus communication unit 80#$i$ in the transmission apparatus 32#$i$ stores information for identifying the path, for example a name of the path and information on input and output points of quality information collecting points of the path in the quality information storing unit 92#$i$, and outputs the path information to the CPU 82#. According to the path information, the CPU 82#$i$ performs path setting in the cross connect unit 86#$i$. When the input IF units 84#$ij$ receive frame data, the input IF units 84#$ij$ output the frame data to the cross connect unit 86#$i$. Also, the input IF units 84#$ij$ calculate quality information from frames of each input channel of the frames, and then output the quality information to the quality information collecting unit 90#$i$. According to the path information, the cross connect unit 86#$i$ maps or demaps the frame data outputted from the input IF units 84#$ij$ (j=1 to m), and outputs the frame data to the corresponding output IF units 88#$ik$. The output IF units 88#$ik$ transmit the frame data to the transmission line 34. The quality information collecting unit 90#$i$ writes the quality information of each input channel which information is outputted from the input IF units #$ij$ to a field corresponding to the channel.

(2) Collecting Quality Information of the Entrance and Exit Points

When a fixed time has passed, the timer 48 in the network monitoring and controlling apparatus 30 notifies the passage of the fixed time to the quality information periodic collection unit 50. When receiving the notification from the timer 48, the quality information periodic collection unit 50 determines a next path for collecting quality information. When the next path is the path a, for example, the quality information periodic collection unit 50 requests the transmission apparatus communication unit 46 to collect quality information from the transmission apparatus 32#A at the entrance point and the transmission apparatus 32#G at the exit point. The transmission apparatus communication unit 46 transmits a message requesting transmission of quality information to the transmission apparatus 32#A at the entrance point and the transmission apparatus 32#G at the exit point. The monitoring and controlling apparatus communication unit 80#$i$ in the transmission apparatus 32#$i$ (i=A, G) searches the quality information storing unit 92#$i$ using the name of the path as an index, reads quality information of the entrance or exit point of the path a, and then transmits the quality information to the network monitoring and controlling apparatus 30. The monitoring and controlling apparatus communication unit 80#$i$ then clears the quality information. When the transmission apparatus communication unit 46 in the network monitoring and controlling apparatus 30 receives the quality information of the entrance and exit points of the path a, the transmission apparatus communication unit 46 outputs the quality information to the data access unit 52.

FIGS. 16A to 16C are diagrams of the quality information of the path a. When the data access unit 52 receives the quality information of the entrance and exit points, the data access unit 52 writes the quality information to fields corresponding to the present time in the quality information storing unit 54, as shown in FIG. 16A.

(3) Quality Deterioration Determination

The quality deterioration detecting unit 56 reads the quality information of the entrance and exit points of the path a from the quality information storing unit 54 via the data access unit 52, and calculates (entrance−exit) quality information. Then, as shown in FIG. 16B, the quality deterioration detecting unit 56 stores the (entrance−exit) quality information in the quality information storing unit 54. The quality deterioration detecting unit 56 determines whether or not there is deterioration in quality of the path a according to the various methods as described above. In the case of FIG. 16B, for example, the quality deterioration detecting unit 56 determines that there is deterioration in the quality of the path a when the (entrance−exit) quality becomes negative. Further, when there is deterioration in the quality of the path a, the quality deterioration detecting unit 56 notifies the deterioration in the quality of the path a to the path via point searching unit 58.

(4) Identifying a Point Deteriorated in Quality

When the path via point searching unit 58 receives the notification that the path a is deteriorated in quality from the quality deterioration detecting unit 56, the path via point searching unit 58 searches the path information storing unit 44 to obtain the active path via points (transmission apparatus 32#C, 32#D, and 32#F) of the path a. The path via point searching unit 58 then outputs the active path via points to the path via point quality information automatic collection unit 60. The path via point quality information automatic collection unit 60 requests the transmission apparatus communication unit 46 to collect quality information of the active path via points of the path a via the data access unit 52.

The transmission apparatus communication unit 46 transmits a message requesting transmission of quality information of the active path via points of the path a to the transmission apparatus 32#i (i=C, D, and F). The monitoring and controlling apparatus communication unit 80#i in the transmission apparatus 32#i (i=C, D, and F) searches the quality storing unit 92#i using the name of the path as an index, and reads quality information of the path via point of the path a. The monitoring and controlling apparatus communication unit 80#i then transmits the quality information to the network monitoring and controlling apparatus 3. When the transmission apparatus communication unit 46 in the network monitoring and controlling apparatus 30 receives the quality information of the active path via points of the path a, the transmission apparatus communication unit 46 outputs the quality information to the data access unit 52.

The data access unit 52 stores the quality information of the active path via points of the path a in the quality information storing unit 54 as shown in FIG. 15B, and also outputs the quality information to the quality deterioration point identifying unit 62 via the path via point quality information automatic collection unit 60. The quality deterioration point identifying unit 62 identifies a point deteriorated in quality, for example a point where the quality information becomes positive for the first time from the quality information of the active path via points. When identifying the quality deterioration point, the quality deterioration point identifying unit 62 notifies the quality deterioration point to the path via point searching unit 58 and the reserve path quality information automatic collection unit 64. When the quality information of the input points of the transmission apparatus 32#C and 32#D is 0 and the quality information of the input point of the transmission apparatus 32#F is 3, for example, the quality deterioration point identifying unit 62 determines that there is quality deterioration between the transmission apparatus 32#E and the transmission apparatus 32#F.

(5) Comparing Quality of the Active Path with Quality of the Reserve Path

When the path via point searching unit 58 receives the notification indicating that the quality deterioration point of the active path is identified from the quality deterioration point identifying unit 62, the path via point searching unit 58 searches the path information storing unit 44 to obtain the reserve path via points (transmission apparatus 32#B, 32#D, and 32#E) of the path a. As in the case of the active path, the reserve path quality information automatic collection unit 64 collects quality information of the reserve path points from the transmission apparatus 32#i (i=B, D, and E) via the data access unit 52 and the transmission apparatus communication unit 46. The quality information of the reserve path points is stored in the quality information storing unit 54 as shown in FIG. 16C. The reserve path quality information automatic collection unit 64 outputs quality information at the present time and in the past of the points of the active path and the reserve path to the quality comparison/changeover unit 66. The quality comparison/changeover unit 66 determines whether or not the active path of the path a is deteriorated in quality as compared with the reserve path according to the various methods described above. When a condition for determining that the active path is deteriorated as compared with the reserve path is active>reserve, for example, the quality information of the active path is 3 and the quality information of the reserve path is 0, and therefore the quality comparison/changeover unit 66 determines that the active path is deteriorated in quality as compared with the reserve path.

(6) Changeover

When the active path is deteriorated in quality as compared with the reserve path, the quality comparison/changeover unit 66 instructs the transmission apparatus 32#G at the exit point of the path to change over to the reserve path via the transmission apparatus communication unit 46. When instructed to change over to the reserve path, the transmission apparatus 32#G selects frame data of an input channel corresponding to the reserve path, and transmits the frame data to the transmission line 34.

As described above in detail, the present invention monitors both lines of the active path and the reserve path of a path, and thus performs quick and reliable changeover automatically at a time of detecting quality deterioration without an operator determining whether to perform changeover. Thus, network management can be performed on a path of good quality at all times, which improves reliability greatly.

In addition, the plurality of patterns for determining quality deterioration allows flexible network management. Further, since only the entrance and exit points of a path are monitored at normal times in performance monitoring, a load on the network monitoring and controlling apparatus is reduced.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A network monitoring and controlling apparatus for monitoring and controlling a transmission network formed by a plurality of transmission apparatus, said network monitoring and controlling apparatus comprising:

a path information storing unit for storing path information on an entrance point for inputting data, an exit point for outputting said data, and a path via point for relaying said data, regarding a path through which said data passes and which path connects a transmission apparatus for inputting said data to said transmission network with a transmission apparatus for outputting said data from said transmission network;

a quality information periodic collection unit for periodically collecting quality information of a channel corresponding to said entrance point and a channel corresponding to said exit point;

a quality deterioration detecting unit for determining whether or not quality of the path is deteriorated on a basis of the quality information of said entrance point and said exit point;

a path via point searching unit for, when said quality deterioration detecting unit determines that said quality of the path is deteriorated, searching said path information storing unit and obtaining information on said path via point of the path deteriorated in quality;

a path via point quality information collection unit for collecting quality information of a channel associated with to said path via point on a basis of the information on said path via point; and a quality deterioration point identifying unit for determining whether or not a deteriorated path via point is present on a basis of the quality information of said path via point.

2. The network monitoring and controlling apparatus as claimed in claim 1,
   wherein said path comprises an active path and a reserve path, and said path via point quality information collection unit collects quality information of channels corresponding to path via points of said active path and said reserve path.

3. The network monitoring and controlling apparatus as claimed in claim 2, further comprising a quality comparison/changeover unit for determining whether or not said active path is deteriorated in quality as compared with said reserve path by comparing quality information of said active path with quality information of said reserve path, and effecting control to change over to said reserve path when said quality comparison/changeover unit determines that said active path is deteriorated in quality as compared with said reserve path.

4. The network monitoring and controlling apparatus as claimed in claim 3,
   wherein said quality information is a numerical value that does not decrease as said data is relayed via the path via point of said path, and said quality deterioration detecting unit detects quality deterioration by comparing a first difference value between the quality information of said entrance point and the quality information of said exit point of said path with a first threshold value.

5. The network monitoring and controlling apparatus as claimed in claim 4,
   wherein said quality deterioration detecting unit determines that the quality of the path is deteriorated when a consecutive number of times said first difference value exceeds said first threshold value exceeds a predetermined detection number.

6. The network monitoring and controlling apparatus as claimed in claim 4,
   wherein said quality deterioration detecting unit determines that the quality of the path is deteriorated when a total number of times said first difference value exceeds said first threshold value exceeds a predetermined detection number within a predetermined determination number.

7. The network monitoring and controlling apparatus as claimed in claim 3,
   wherein said quality comparison/changeover unit determines whether or not said active path is deteriorated in quality as compared with said reserve path on a basis of quality information at present and in a past of said active path and said reserve path.

8. The network monitoring and controlling apparatus as claimed in claim 4,
   wherein said quality comparison/changeover unit determines whether or not said active path is deteriorated in quality as compared with said reserve path by comparing a second threshold value with a second difference value between a value based on quality information at a present time of the path via point of said active path and a value based on quality information at the present time of the path via point of said reserve path.

9. The network monitoring and controlling apparatus as claimed in claim 8,
   wherein said quality comparison/changeover unit determines whether or not said active path is deteriorated in quality as compared with said reserve path when a consecutive number of times said second difference value exceeds said second threshold value exceeds a predetermined detection number.

10. The network monitoring and controlling apparatus as claimed in claim 8,
    wherein said quality comparison/changeover unit determines whether or not said active path is deteriorated in quality as compared with said reserve path when a total number of times said second difference value exceeds said second threshold value exceeds a predetermined detection number within a predetermined determination number.

\* \* \* \* \*